(12) United States Patent
Mu

(10) Patent No.: US 12,047,945 B2
(45) Date of Patent: Jul. 23, 2024

(54) SCHEDULING METHOD AND APPARATUS FOR TRANSPORT BLOCKS

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 411 days.

(21) Appl. No.: 17/507,666

(22) Filed: Oct. 21, 2021

(65) Prior Publication Data
US 2022/0046676 A1 Feb. 10, 2022

Related U.S. Application Data

(63) Continuation of application No. PCT/CN2019/084375, filed on Apr. 25, 2019.

(51) Int. Cl.
| | |
|---|---|
| *H04W 72/1268* | (2023.01) |
| *H04W 72/1263* | (2023.01) |
| *H04W 72/1273* | (2023.01) |
| *H04W 72/23* | (2023.01) |
| *H04W 72/50* | (2023.01) |

(52) U.S. Cl.
CPC ... *H04W 72/1268* (2013.01); *H04W 72/1263* (2013.01); *H04W 72/1273* (2013.01); *H04W 72/23* (2023.01); *H04W 72/535* (2023.01)

(58) Field of Classification Search
CPC ........... H04W 72/1268; H04W 72/535; H04W 72/23; H04W 72/1263; H04W 72/1273
See application file for complete search history.

(56) References Cited

U.S. PATENT DOCUMENTS

| | | | |
|---|---|---|---|
| 10,601,567 B2 * | 3/2020 | Marinier | H04L 1/0028 |
| 11,419,131 B2 * | 8/2022 | Vos | H04L 1/0071 |
| 2021/0314996 A1 * | 10/2021 | Liu | H04L 5/0058 |

FOREIGN PATENT DOCUMENTS

CN 109075961 A 12/2018

OTHER PUBLICATIONS

Japanese Patent Application No. 2021-562391, Office Action dated Nov. 8, 2022, 5 pages.
Japanese Patent Application No. 2021-562391, English translation of Office Action dated Nov. 8, 2022, 5 pages.
Sierra Wireless "Multiple TB Grant Design for Unicast"; 3GPP TSG RAN WG1 Meeting 94; R1-1808355; Aug. 2018; 12 pages.
European Patent Application No. 19926571.1, extended Search and Opinion dated Mar. 25, 2022, 12 pages.
(Continued)

*Primary Examiner* — Chandrahas B Patel
(74) *Attorney, Agent, or Firm* — Cozen O'Connor

(57) ABSTRACT

Methods for scheduling transport blocks, and an apparatus for scheduling transport blocks. The method includes: determining transmission interval parameters, in which the transmission interval parameters are used to determine a mode of setting a transmission interval among transport blocks; scheduling the transport blocks on a physical downlink control channel (PDCCH) according to the transmission interval parameters, the transport blocks scheduled on the PDCCH including at least one of physical uplink shared channel (PUSCH) transport blocks and physical downlink shared channel (PDSCH) transport blocks.

19 Claims, 4 Drawing Sheets

(56) References Cited

OTHER PUBLICATIONS

Huawei "Scheduling of multiple transport blocks"; 3GPP TSG RAN WG1 Meeting #96; R1-1901510; Feb. 2019; 8 pages.
PCT/CN2019/084375 English translation of the International Search Report dated Jan. 23, 2020, 2 pages.

* cited by examiner

SCHEDULING METHOD AND APPARATUS FOR TRANSPORT BLOCKS

CROSS-REFERENCE TO RELATED APPLICATION

The present application is a continuation application of PCT Application No. PCT/CN2019/084375 filed on Apr. 25, 2019, the entire contents of which are incorporated herein by reference.

TECHNICAL FIELD

The disclosure relates to the field of communication technology, in particular to methods for scheduling transport blocks, and an apparatus for scheduling transport blocks.

BACKGROUND

Machine Type Communication (MTC) and Narrow Band Internet of Thing (NB-IoT) as representatives of the cellular Internet of Things, are widely used in data collection, intelligent transportation and other fields. Since the terminals using MTC and NB-IoT are generally deployed in locations where it is not easy to charge or replace batteries, it is best to use terminals that have low power consumption.

According to the current version of the protocol, base stations using MTC and NB-IoT adopt a method for scheduling the transport blocks (TB), and continuously schedule the transport blocks through a physical downlink control channel (PDCCH), thereby reducing the power consumption of receiving or blindly detecting the power consumption of the PDCCH before the terminal receives or sends data. In addition, in the coverage enhancement scenario, the base station will schedule the same transport blocks to be sent repeatedly for multiple times, so that the coverage can be enhanced by repeatedly sending the same transport blocks.

SUMMARY

The embodiments of the disclosure provide methods for scheduling transport blocks, and an apparatus for scheduling transport blocks. The technical solution is as follows.

Embodiments of the disclosure provide a method for scheduling transport blocks. The method includes: determining transmission interval parameters, in which the transmission interval parameters are used to determine a mode of setting a transmission interval among transport blocks; scheduling the transport blocks on a physical downlink control channel (PDCCH) according to the transmission interval parameters, the transport blocks scheduled on the PDCCH including at least one of physical uplink shared channel (PUSCH) transport blocks and physical downlink shared channel (PDSCH) transport blocks.

Embodiments of the disclosure provide a method for scheduling transport blocks. The method includes: receiving transport blocks scheduled by the base station on a physical downlink control channel (PDCCH); setting a transmission interval among the transport blocks according to the scheduled transport blocks and the transmission interval parameters, in which the transmission interval parameters are configured to determine a setting mode of the transmission interval among the transport blocks, the transport blocks include at least one of physical uplink shared channel (PUSCH) transport blocks and physical downlink shared channel (PDSCH) transport blocks.

Embodiments of the disclosure in another aspect provide an apparatus for scheduling transport blocks, and the apparatus includes: one or more processors; a memory storing instructions executable by the one or more processors; in which the one or more processors are configured to: receive transport blocks scheduled by the base station on a physical downlink control channel (PDCCH); set a transmission interval among the transport blocks according to the scheduled transport blocks and the transmission interval parameters, the transmission interval parameters are configured to determine a setting mode of the transmission interval among the transport blocks, the transport blocks include at least one of physical uplink shared channel (PUSCH) transport blocks and physical downlink shared channel (PDSCH) transport blocks.

BRIEF DESCRIPTION OF THE DRAWINGS

In order to clearly illustrate the technical solution of embodiments of the disclosure, a brief description of drawings used in embodiments is given below. Obviously, the drawings in the following descriptions are only part embodiments of the disclosure, and for those skilled in the art, other drawings can be obtained according to these drawings without creative labor.

DETAILED DESCRIPTION

In order to make clear the objectives, technical solutions, and advantages of the invention, the implementation of the invention will be further described in detail below in combination with the accompanying drawings.

In related arts, when the method for scheduling the transport blocks is adopted, the continuously scheduled transport blocks will occupy physical resources for a long time, which in turn affects the scheduling of other terminals.

The communication system and business scenarios described in the embodiments of this disclosure are intended to more clearly illustrate the technical solution of the embodiments of the disclosure, and do not constitute a limitation to the technical solution of the embodiments of the disclosure. Those of ordinary skill in the art will know that with the evolution of communication systems and the emergence of new business scenarios, the technical solution of the embodiments of the disclosure is equally applicable to similar technical problems.

The beneficial effects brought about by the technical solution of the embodiments of the disclosure include at least: scheduling transport blocks on the PDCCH, determining the transmission interval parameters, and setting the transmission interval among the transport blocks when scheduling the transport blocks according to the transmission interval parameters, the physical resources released in the transmission interval are used for scheduling by other terminals. Therefore, the impact of the continuous scheduling of the transport blocks on the scheduling of other terminals is avoided, and the timeliness of scheduling other terminals is improved.

Figure 1:
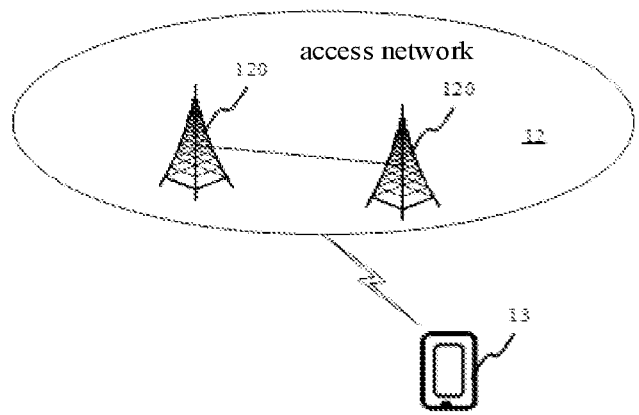
FIG. 1 is a schematic diagram of a communication system according to an exemplary embodiment of the disclosure.

FIG. 1 is a schematic diagram of a communication system according to an exemplary embodiment of the disclosure. In this embodiment, the communication system is an MTC communication system or an NB-IoT communication system as an example for description. As illustrated in FIG. 1, the communication system may include: an access network 12 and a terminal 13.

The access network 12 includes several access network devices 120. The access network device 120 and the core network device communicate with each other through a certain interface technology. For example, in the NB-IoT communication system, the access network device 120 communicates with the core network device through Si interface. The access network device 120 may be a base station, and the base station is a device deployed in an access network to provide a wireless communication function for a terminal. In the MTC communication system, the base station is the MTC base station, and in the NB-IoT communication system, the base station is the NB-IoT base station. The base station may include various forms of macro base stations, micro base stations, relay stations, and access points. In systems using different wireless access technologies, the names of devices with base station functions may be different, and with the evolution of communication technology, the description of the name "base station" may change. Although "base station" is used as an example in the embodiments of the disclosure, the base station can be understood as an access network device used to provide user access functions in various communication systems.

The terminal 13 may include various handheld devices with wireless communication functions, vehicle-mounted devices, wearable devices, computing devices or other processing devices connected to wireless modems, as well as various forms of user equipment (UE), mobile stations (MS), and terminal devices. In the embodiments of the disclosure, the terminal 13 is an MTC terminal in an MTC communication system, or an NB-IoT terminal in an NB-IoT communication system. For example, the terminal 13 is a device deployed on a smart light pole, a device deployed on a shared bicycle, or a device deployed on a smart parking space. The embodiments of the disclosure limit the specific deployment method and device form of the terminal 13. For ease of description, the devices mentioned above are collectively referred to as terminals.

Since the terminal in the above communication system is generally set in a location that is not easy to charge or replace the battery, in order to reduce the power consumption of the terminal, the base station adopts a method for scheduling multi-transport blocks for multi-transport-block scheduling on one PDCCH at the same time. Correspondingly, the terminal only needs to demodulate one PDCCH scheduled by the base station before receiving or sending data, thereby reducing the power consumption of the terminal during demodulation.

Figure 2:
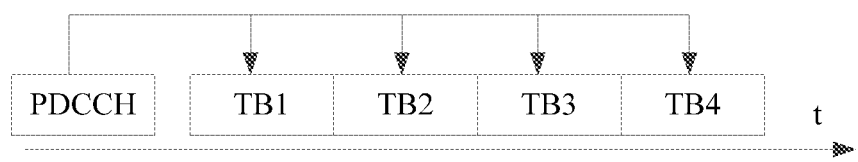
FIG. 2 is a schematic diagram of multi-transport-block scheduling.

Illustratively, as illustrated in FIG. 2, the base station adopts a method for scheduling transport blocks to schedule transport blocks TB1, TB2, TB3, and TB4 on the same PDCCH at the same time.

Moreover, in the MTC communication system and the NB-IoT communication system, in order to enhance coverage, the terminal will adopt a continuous transmission mode to repeatedly transmit the same transport block. Correspondingly, when performing the multi-transport-block scheduling, the base station needs to schedule the same transport block to be repeatedly transmitted for multiple times on the PDCCH.

Figure 3:
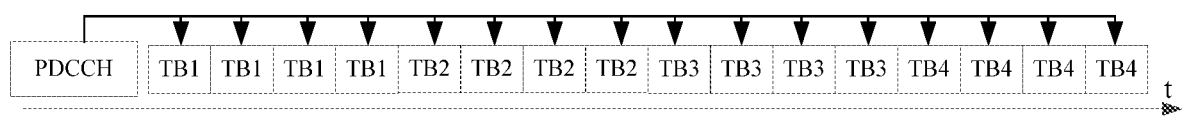
FIG. 3 is a schematic diagram of multi-transport-block scheduling under coverage enhancement.

Schematically, as illustrated in FIG. 3, when achieving coverage enhancement in the multi-transport-block scheduling scenario, the base station simultaneously schedules the transport blocks TB1, TB2, TB3, and TB4 on the same PDCCH, and each transport block is repeatedly transmitted for 4 times.

In addition, in order to obtain the time diversity gain, when achieving coverage enhancement, the terminal further adopts an alternate transmission mode to repeatedly transmit the transport block in stages. Correspondingly, when performing the multi-transport-block scheduling, the base station needs to schedule the same transport block for repeated transmissions based on an alternate scheduling mechanism.

Figure 4:
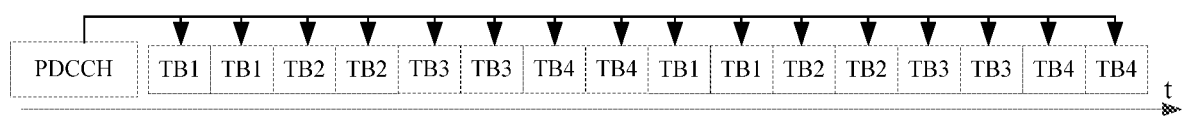
FIG. 4 is a schematic diagram of alternatively multi-transport-block scheduling.

Schematically, as illustrated in FIG. 4, the base station schedules the transport blocks TB1, TB2, TB3, and TB4 on the same PDCCH at the same time, and each transport block is transmitted for 4 times repeatedly. When the alternate scheduling mechanism is introduced, the base station schedules first two times of each transport block for transmission, and then schedules the last two times of each transport block for transmission.

However, during the multi-transport-block scheduling, the continuously scheduled transport blocks will occupy physical resources for a long time, causing other terminals to be unable to perform scheduling on multi-transport-block scheduling components.

In order to solve the above problem, in the embodiments of the disclosure, in the process of multi-transport-block scheduling, a transmission interval is set among the transport blocks, and the physical resources released in the transmission interval are used for scheduling by other terminals, thereby ensuring the quality of scheduling the transport blocks, while reducing the impact of multi-transport-block scheduling on scheduling by other terminals. Illustrative embodiments are used for description below.

Figure 5:
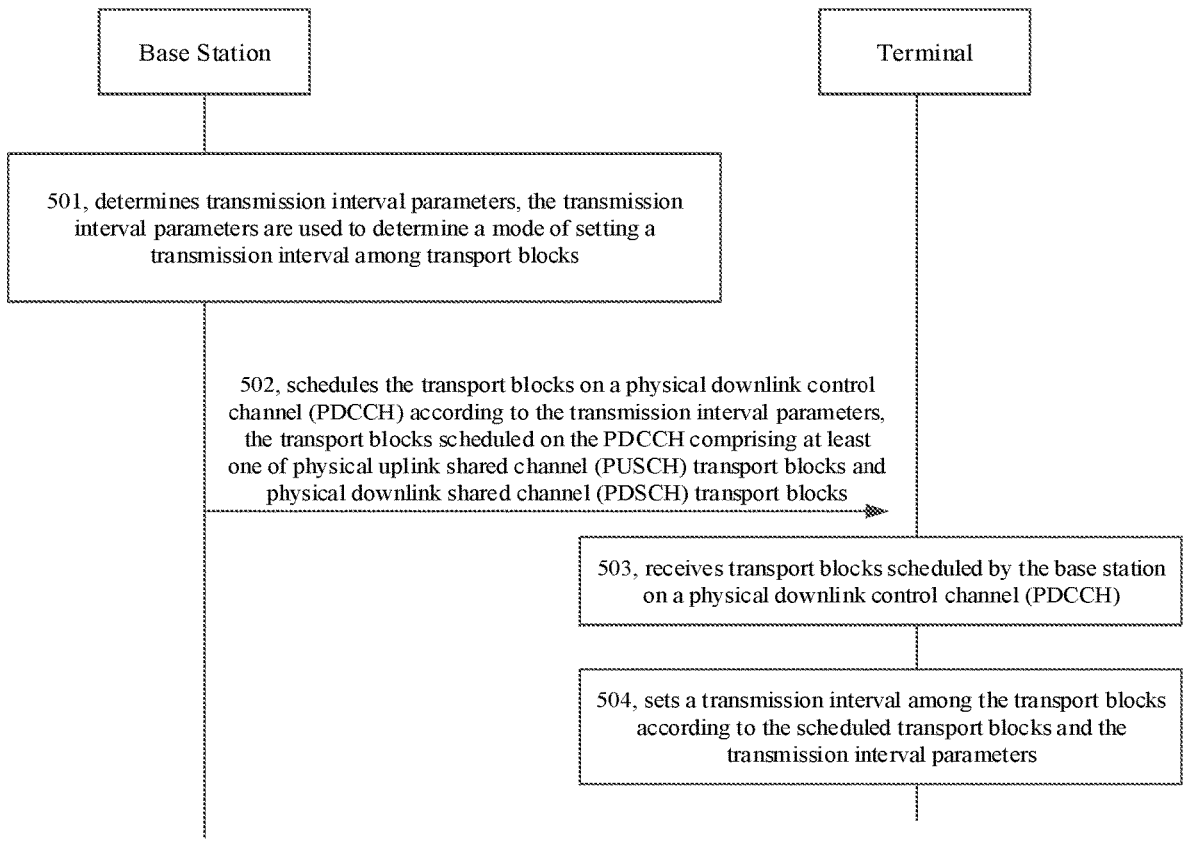
FIG. 5 is a flowchart of a method for scheduling transport blocks according to an exemplary embodiment of the disclosure.

FIG. 5 is a flowchart of a method for scheduling transport blocks according to an exemplary embodiment of the disclosure. The method may be executed by the communication system shown in FIG. 1, and the method includes the followings.

In step 501, the base station determines transmission interval parameters, the transmission interval parameters are used to determine a mode of setting a transmission interval among transport blocks.

In a possible implementation, in any scenario, the base station performs the step of determining the transmission interval parameters.

In another possible implementation, when in the scenario where the use of transmission interval is allowed, the base station determines the transmission interval parameters. When in the scenario where the use of the transmission interval is not allowed, the base station does not perform the step of determining the transmission interval parameters. The scenario where the transmission interval is allowed to be used is preset.

Optionally, the transmission interval parameters include a transmission interval period and a transmission interval duration. The transmission interval period is the period for setting the transmission interval, and the transmission interval duration is the duration of each transmission time.

In step 502, the base station schedules the transport blocks on the PDCCH according to the transmission interval parameters, and the transport blocks scheduled on the PDCCH include at least one of a PUSCH transport block and a PDSCH transport block.

Optionally, when the PDCCH is applied to the MTC communication system, the PDCCH is MPDCCH. When the PDCCH is applied to the NB-IoT communication system, the PDCCH is NPDCCH. For ease of presentation, in the embodiments of the disclosure, MPDCCH and NPDCCH are collectively referred to as the PDCCH.

In a possible implementation, if the current scheduling scenario meets the preset conditions, the base station will schedule the transport blocks on the PDCCH according to the transmission interval parameters. If the current scheduling scenario does not meet the preset conditions, the base station will schedule the transport blocks on the PDCCH according to the original scheduling logic (no transmission interval is set between the transport blocks).

Optionally, when the transport blocks scheduled on the PDCCH are PUSCH transport blocks, the terminal uses the PUSCH transport blocks allocated by the base station to send uplink data to the base station. When the transport blocks scheduled on the PDCCH are PDSCH transport blocks, the base station sends downlink data to the terminal through the corresponding PDSCH transport blocks.

In step 503, the terminal receives the transport blocks scheduled by the base station on the PDCCH.

In step 504, the terminal sets the transmission interval among the transport blocks according to the scheduled transport blocks and the transmission interval parameters.

In a possible implementation, when the transmission interval setting conditions are met, the transmission interval is set among the PUSCH transport blocks to be transmitted according to the scheduled transport blocks of the base station and the stored transmission interval parameters, or when the PDSCH transport blocks are received, and the transmission interval locations are determined, the transport blocks sent by the base station to the terminal are determined.

It can be determined whether the transmission interval setting conditions are met can be explicitly indicated by the base station, or can be determined by the terminal itself.

In conclusion, in the embodiments, in the process of scheduling the transport blocks on the PDCCH, the transmission interval parameters are determined, and when the transport blocks are scheduled according to the transmission interval parameters, the transmission interval is set among the transport blocks, so that the physical resources released in the transmission interval are used for scheduling by other terminals, thereby avoiding the impact of the continuous scheduling of the transport blocks scheduled by other terminals, and improving the timeliness of scheduling by other terminals.

Regarding the configuration of the transmission interval parameters in the embodiments, in a possible implementation, the base station uses high-level signaling to configure the transmission interval parameters to the terminal. The high-level signaling includes at least one of a RRC signaling and a MAC CE signaling. Correspondingly, the terminal receives the transmission interval parameters configured by the base station through the high-level signaling, and stores the transmission interval parameters.

It should be noted that in the above embodiments, the steps of the execution subject of the base station can be separately implemented as the method of scheduling the transport blocks on the base station side, and the steps of the execution subject of the terminal can be separately implemented as the method of scheduling the transport blocks on the terminal side. The embodiments of the disclosure will not be repeated here.

In a possible implementation, not all scenarios need to set a transmission interval among the transport blocks, and the base station is allowed to use the transmission interval only when the transmission interval is allowed. For step 501 in the embodiments shown in FIG. 5, optionally, when the preset conditions are met, the base station executes the step of determining the transmission interval parameters.

The preset condition includes at least one of followings.

(1) A multi-transport-block scheduling is adopted.

Multi-transport-block scheduling refers to scheduling at least two transport blocks on the PDCCH. In an illustrative example, as illustrated in FIG. 2, when the four transport blocks TB1, TB2, TB3, and TB4 are simultaneously scheduled on the PDCCH, the base station is determined in a multi-transport block scheduling scenario and allows the use of transmission interval.

Optionally, when single transport block scheduling is used, in order to avoid setting the transmission interval to affect the scheduling efficiency, the base station will not perform the step of determining the transmission interval parameters.

(2) A maximum number of times of repeated transmissions configured for a channel is greater than a threshold of times of repeated transmissions.

Optionally, the maximum number of times of repeated transmissions configured for the channel is the maximum value in the set of times of repeated transmissions configured for the control channel (which can be the PDCCH channel) or the data channel (which can be the scheduled PDSCH or PUSCH channel), and the threshold of the number of times of repeated transmissions is a preset value in the protocol.

In an illustrative example, the set of times of repeated transmission configured for the channel is {2,4,8,16}, and the threshold of the number of times of repeated transmissions is 8, since the maximum number of times of repeated transmissions of the channel is 16, which is greater than the threshold of times of repeated transmissions 8, so the base station determines that the transmission interval is allowed.

Optionally, when the maximum number of times of repeated transmissions of the channel is less than the threshold of the number of times of repeated transmissions, even if the transmission interval is not set, the scheduling of other terminals will not be greatly affected. Therefore, the base station will not perform the step of determining the transmission interval parameters.

(3) A continuous transmission mode is adopted. Under the continuous transmission mode, a next transport block is repeatedly transmitted after a transport block is repeatedly transmitted for n times, and n represents a total number of times of repeated transmissions of the transport blocks.

When the transport blocks adopt the continuous transmission mode, repeated transmission of the same transport block will affect the scheduling of other terminals. Therefore, the base station determines that the transmission interval is allowed to be used when the continuous transmission mode is detected.

Optionally, when the transport blocks adopt the alternate transmission mode (as shown in FIG. 4), the base station does not allow the transmission interval to be used in the alternate transmission process.

(4) The continuous transmission mode is adopted, and the maximum number of times of repeated transmissions configured for the channel is greater than a threshold of times of repeated transmissions.

When the configured maximum number of times of repeated transmissions of the channel is less than the threshold of times of repeated transmissions, the maximum number is limited by the number of repeated transmissions of the channel itself. Even if the continuous transmission mode is adopted, it will not have a significant impact on the scheduling of other terminals. Therefore, the base station adopts the continuous transmission mode and the maximum number of times of repeated transmissions of the channel is greater than the threshold of times of repeated transmissions, the transmission interval is determined to be allowed.

In a possible implementation, some of the transmission interval parameters may adopt fixed values, and some of the parameters may adopt configurable values, or all parameters may adopt configurable values. When the transmission interval parameters include the transmission interval period and the transmission interval duration, the transmission interval parameter may be any one of: the transmission interval period and the transmission interval duration are both configurable values; or, the transmission interval period is a configurable value, and the transmission interval duration is a fixed value; or, the transmission interval period is a fixed value, and the transmission interval duration is a configurable value.

Optionally, when the transmission interval period is a configurable value, in step 501, determining the transmission interval parameters may include the followings.

1. In responding to adopting the continuous transmission mode, determining the transmission interval period according to a number of times of repeated transmissions of the transport blocks.

In a possible implementation, in the continuous transmission mode, the occurrence period of the transmission interval is in the unit of the transport block, and the base station determines the transmission interval period according to the (total) number of repeated transmissions of the transport blocks.

Optionally, the base station determines an integral multiple of the number of repeated transmissions as the transmission interval period. For example, when the number of repeated transmissions is K, the transmission interval period is determined to be K×N (N≥1), that is, after N transport blocks are repeatedly transmitted, a transmission interval is set.

Figure 6:
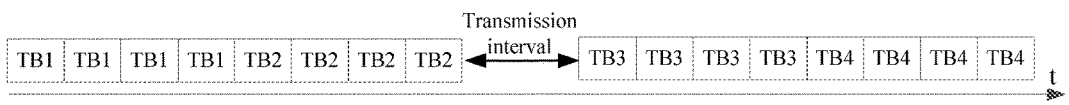
FIG. 6 is a schematic diagram of a transmission interval period in a continuous transmission mode.
Figure 7:
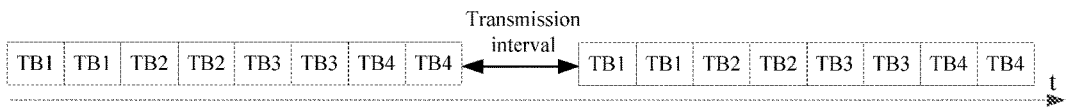
FIG. 7 is a schematic diagram of the transmission interval period in an alternate transmission mode.

In an illustrative example, as illustrated in FIG. 6, when four transport blocks need to be scheduled, and the number of repeated transmissions for each transport block is 4, the base station determines that the transmission interval period is 8, that is, after transmitting 2 transport blocks, a transmission interval is set.

2. In responding to adopting an alternate transmission mode, determining the transmission interval period by an alternate transport unit, the alternate transport unit being a smallest transport unit comprising different transport blocks.

In a possible implementation, when the alternate transmission mode is adopted, the base station determines the transmission interval period by using the alternate transmission unit as a unit.

Optionally, the base station determines an integer multiple of the alternate transport unit as the transmission interval period.

In an illustrative example, as illustrated in FIG. 4, when four transport blocks are alternately transmitted, the alternate transport unit includes two TB1*s*, two TB2*s*, two TB3*s*, and two TB4*s*. As illustrated in FIG. 6, the base station determines the transmission interval as an alternate transport unit, that is, a transmission interval between two alternate transport units is set.

3. The transmission interval period is determined according to the number of scheduled transport blocks.

In a possible implementation, the base station determines an integer multiple of the number of scheduled transport blocks as the transmission interval period.

In an illustrative example, the base station determines that the number of the scheduled transport blocks is 4, and the transmission interval period is determined to be 8 transport blocks, that is, a transmission interval is set between every 8 transport blocks.

4. The transmission interval period is determined by an absolute time unit, the absolute time unit includes at least one of a subframe and a time slot.

The transmission interval period may be in units of absolute time in addition to transport blocks or alternate transport units. Optionally, the transmission interval period is N times of an absolute time unit.

For example, the base station determines the transmission interval period as 20 subframes, that is, a transmission interval is set every 20 subframes.

Certainly, in addition to the several methods of determining the transmission interval period, other methods may also be used to determine the transmission interval period, which is not limited in the embodiments of the disclosure.

Optionally, when the transmission interval duration is a configurable value, in step 501, the possible manners may be included when determining the transmission interval parameters.

1. The transmission interval duration is determined according to the number of times of repeated transmissions of the transport blocks.

In a possible implementation, the base station may determine the transmission interval duration according to the (total) number of times of repeated transmissions of the transport blocks configured in the current scheduling. Optionally, the base station determines the transmission interval duration to be N times of the number of times of repeated transmissions.

In an illustrative example, when N is set to 2, if the number of repeated transmissions of the transport blocks in the current scheduling is 100, the base station will determine the transmission interval duration as 200 ms. If the number of repeated transmissions of the transport blocks in the current scheduling is 50 times, the base station determines the transmission interval time as 100 ms.

2. The transmission interval duration is determined according to the number of scheduled transport blocks.

In a possible implementation, the base station determines the transmission interval duration as an integer multiple of the number of the scheduled transport blocks.

In an illustrative example, when the number of the scheduled transport blocks is 10, the base station determines the transmission interval duration as 100 ms, and when the number of the scheduled transport blocks is 20, the base station determines the transmission interval duration to be 200 ms.

3. The transmission interval duration is determined by an absolute time unit, the transmission interval is an integer multiple of the absolute time unit, and the absolute time unit includes at least one of a subframe and a time slot.

Similar to determining the transmission interval period, in a possible implementation, the base station may set the transmission interval duration to an integer multiple of the absolute time unit.

In an illustrative example, the base station determines the transmission interval duration to be 100 times of the subframe, that is, the transmission interval duration is 100 ms.

Certainly, in addition to the above several methods for determining the transmission interval duration, other methods may also be used to determine the transmission interval duration, which is not limited in the embodiments of the disclosure.

In a possible implementation, after the transmission interval parameter is determined, the base station needs to meet specific conditions before scheduling the transport blocks (setting the transmission interval) according to the transmission interval parameters. Optionally, the step 502 may include the following possible implementations.

1. In responding to adopting multi-transport-block scheduling, the base station schedules the transport blocks on the PDCCH according to the transmission interval parameters, the multi-transport-block scheduling refer to scheduling at least two transport blocks on the PDCCH.

In a possible implementation, once the transmission interval parameters are configured, subsequent multi-transport-block scheduling is performed, and the base station will schedule the transport blocks based on the transmission interval parameters.

Correspondingly, in a possible implementation, after the terminal receives the transport block scheduling of the base station, when it detects that the multi-transport-block scheduling is adopted, the transmission interval among the uplink transport blocks is set according to the transmission interval period and the transmission interval duration indicated by the transmission interval parameters, or the transport blocks sent to itself are identified from the downlink transport block according to the transmission interval period and the transmission interval duration.

2. The transport blocks on the PDCCH are scheduled by the base station according to the transmission interval parameters in responding to the number of the transport blocks being greater than a number threshold.

In a possible implementation, after the transmission interval parameters are configured, the base station will schedule the transport blocks based on the transmission interval parameters only when the number of currently scheduled transport blocks is greater than the number threshold, and in the process of sending the downlink transport block, the transmission interval is set according to the transmission interval period and the transmission interval duration specified by the transmission interval parameters. In the process of sending the downlink transport blocks, the transmission interval is set according to the transmission interval period and the transmission interval duration specified by the transmission interval parameters. Otherwise, the base station will not set a transmission interval among the transport blocks.

In an illustrative example, if the number of the currently scheduled transport blocks is greater than 3, that is, when three different transport blocks need to be scheduled, the base station will schedule the transport blocks based on the transmission interval parameters.

Correspondingly, in a possible implementation, after receiving the transport block scheduling of the base station, when the terminal detects that the number of the scheduled transport blocks is greater than the number threshold, the transmission interval among the uplink transport blocks is determined according to the transmission interval period and the transmission interval duration indicated by the transmission interval parameters, or the transport blocks sent to itself are identified from the downlink transport blocks according to the transmission interval period and the transmission interval duration.

Optionally, the number threshold is a fixed value or is dynamically configured to the terminal through high-level signaling.

3. The transport blocks on the PDCCH are scheduled according to the transmission interval parameters in responding to the number of the transport blocks being greater than a number threshold.

In a possible implementation, after the transmission interval parameters are configured, only when the number of repeated transmissions of the currently configured transport blocks is greater than the number threshold, the transport blocks are scheduled based on the transmission interval parameters. In the process of sending the downlink transport blocks, the transmission interval is set according to the transmission interval period and the transmission interval duration specified by the transmission interval parameters. In the process of sending the downlink transport blocks, the transmission interval is set according to the transmission interval period and the transmission interval duration specified according to the transmission interval parameters. Otherwise, the base station will not set a transmission interval among the transport blocks.

In an illustrative example, if the number of repeated transmissions of the currently configured transport blocks is greater than 50, that is, when each transport block needs to be repeatedly transmitted for 50 times, the base station will schedule the transport block based on the transmission interval parameters.

Correspondingly, in a possible implementation, after the terminal receives the transport block scheduling of the base station, when it is detected that the number of repeated transmissions of the currently configured transport blocks is greater than the number threshold, the transmission interval is set between the uplink transport blocks according to the transmission interval period and the transmission interval duration indicated by the transmission interval parameters, or the transport blocks sent to itself are identified from the downlink transport blocks according to the transmission interval period and the transmission interval duration.

Optionally, the number threshold is a fixed value or is dynamically configured to the terminal through high-layer signaling.

4. The transport blocks on the PDCCH are scheduled according to the transmission interval parameters in responding to a total transmission duration being greater than a duration threshold, the total transmission duration is determined according to the number of the transport blocks and the number of times of repeated transmissions of the transport blocks.

In a possible implementation, the base station determines the total transmission time duration of the transport blocks according to the number of currently scheduled transport blocks and the number of repeated transmissions of each transport block. If the total transmission duration is greater than the duration threshold, in order to reduce the impact on the scheduling of other terminals, the base station schedules the transport blocks based on the transmission interval parameters (the transmission interval among the transport blocks is set). If the total transmission duration is less than the duration threshold, the base station schedules the transport blocks based on the original scheduling logic (without setting the transmission interval).

In an illustrative example, the base station calculates that the total transmission time is 200 ms according to the 4 transport blocks currently scheduled and the number of repeated transmissions of each transport block is 50 times. Since the total transmission duration is greater than the duration threshold 150 ms, the base station schedules the transport blocks according to the transmission interval parameters.

Correspondingly, in a possible implementation, after the terminal receives the transport blocks scheduled by the base station, when it detects that the total transmission duration is greater than the duration threshold, the transmission interval among the uplink transmission blocks is determined according to the transmission interval period and the transmission interval duration indicated by the transmission interval parameters, or the transport blocks sent to itself are identified from the downlink transport blocks according to the transmission interval period and the transmission interval duration.

Optionally, the duration threshold is a fixed value or is dynamically configured to the terminal through high-layer signaling.

5. The base station sends the downlink control information (DCI) to the terminal through the PDCCH, the DCI includes parameter usage information configured to indicate whether the transmission interval is preset in a current scheduling.

In the above method, whether the terminal uses the configured transmission interval parameters is determined by the terminal itself. In another possible implementation, the base station may add parameter usage information to the issued DCI through explicit indication, so as to indicate whether the terminal uses the configured transmission interval parameters through the parameter usage information.

Optionally, 1 bit parameter usage information is set in the DCI. When the parameter usage information is 1, it indicates that the transmission interval is set in the current scheduling. When the parameter usage information is 0, it indicates that the transmission interval is not set in the current scheduling.

Correspondingly, after receiving the DCI sent by the base station, the terminal reads the parameter usage information in the DCI, and when the parameter usage information indicates to set the transmission interval, the transmission interval is set among the transport blocks according to the scheduled transport blocks and transmission interval parameters.

It should be noted that the above various embodiments can also be freely divided and/or combined into new embodiments by those skilled in the art, which is not limited.

The following are device embodiments of the embodiments of the disclosure. For details that are not described in detail in the device embodiments, reference may be made to the above one-to-one corresponding method embodiments.

Figure 8:
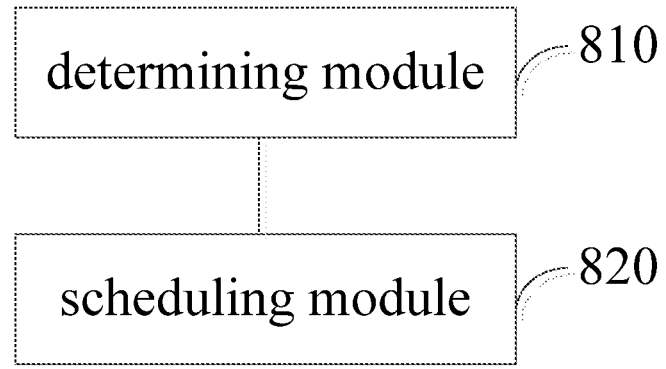
FIG. 8 is a block diagram of an apparatus for scheduling transport blocks according to an exemplary embodiment of the disclosure.

FIG. 8 is a block diagram of an apparatus for scheduling transport blocks according to an exemplary embodiment of the disclosure. The device can be implemented as all or part of the base station (or an access network device) through software, hardware or a combination of both the hardware and the software. The apparatus includes: a determining module 810 and a scheduling module 820.

The determining module 810 is configured to determine transmission interval parameters, in which the transmission interval parameters are used to determine a mode of setting a transmission interval among transport blocks.

The scheduling module 820 is configured to schedule the transport blocks on a physical downlink control channel (PDCCH) according to the transmission interval parameters, the transport blocks scheduled on the PDCCH includes at least one of physical uplink shared channel (PUSCH) transport blocks and physical downlink shared channel (PDSCH) transport blocks.

In a possible implementation, the determining module 810 is configured to determine the transmission interval parameters when a preset condition is met. The preset condition includes at least one of: adopting multi-transport-block scheduling, in which the multi-transport-block scheduling refers to scheduling at least two different transport blocks on the PDCCH; a maximum number of times of repeated transmissions configured for a channel being greater than a threshold of times of repeated transmissions; adopting a continuous transmission mode, after a transport block is repeatedly transmitted for n times, a next transport block is repeatedly transmitted, and n represents a total number of times of repeated transmissions of the transport blocks; and adopting the continuous transmission mode, and the maximum number of times of repeated transmissions configured for the channel being greater than a threshold of times of repeated transmissions.

In a possible implementation, the transmission interval parameters include a transmission interval period and a transmission interval duration. The transmission interval period and the transmission interval duration are both configurable values; or, the transmission interval period is a configurable value, and the transmission interval duration is a fixed value; or, the transmission interval period is a fixed value, and the transmission interval duration is a configurable value.

In a possible implementation, the transmission interval period is a configurable value, the determining module 810 is configured to: in responding to adopting the continuous transmission mode, determine the transmission interval period according to a number of times of repeated transmissions of the transport blocks; or, in responding to adopting an alternate transmission mode, determine the transmission interval period by an alternate transport unit, the alternate transport unit being a smallest transport unit comprising different transport blocks; or, determine the transmission interval period according to the number of scheduled transport blocks; or, determine the transmission interval period by an absolute time unit, the absolute time unit including at least one of a subframe and a time slot.

In a possible implementation, the transmission interval duration is a configurable value, the determining module 810 is configured to: determine the transmission interval duration according to the number of times of repeated transmissions of the transport blocks; or, determine the transmission interval duration according to the number of scheduled transport blocks; or, determine the transmission interval duration by an absolute time unit, the absolute time unit including at least one of a subframe and a time slot.

Optionally, the apparatus further includes: a configuring module, configured to configure the transmission interval parameters for a terminal adopting a high-level signaling, in which the high-level signaling includes at least one of a radio resource control (RRC) signaling and a media access control element (MAC CE) signaling.

In a possible implementation, the scheduling module is configured to: in responding to adopting multi-transport-block scheduling, schedule the transport blocks on the PDCCH according to the transmission interval parameters, in which the multi-transport-block scheduling refer to scheduling at least two transport blocks on the PDCCH; or, send downlink control information (DCI) to the terminal through the PDCCH, the DCI includes parameter usage information configured to indicate whether the transmission interval is preset in a current scheduling; or, schedule the transport blocks on the PDCCH according to the transmission interval parameters in responding to the number of the transport blocks being greater than a number threshold; or, schedule the transport blocks on the PDCCH according to the transmission interval parameters in responding to the number of repeated transmissions of the transport blocks being greater than the threshold; or, schedule the transport blocks on the PDCCH according to the transmission interval parameters in responding to a total transmission duration being greater than a duration threshold, in which the total transmission duration is determined according to the number of the transport blocks and the number of times of repeated transmissions of the transport blocks.

It should be noted that the modules related to signaling and data transmission in the above devices can be implemented as hardware devices such as radio frequency antennas, and the modules related to signaling and data processing can be implemented as hardware devices such as central processing units or baseband processors.

Figure 9:
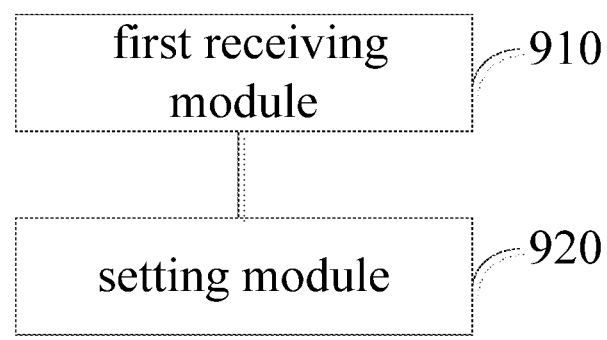
FIG. 9 is a block diagram of an apparatus for scheduling transport blocks according to another exemplary embodiment of the disclosure.

FIG. 9 is a block diagram of an apparatus for scheduling the transport modules according to another exemplary embodiment of the disclosure. The apparatus can be implemented as all or a part of the terminal through software, hardware or a combination of both software and hardware. The apparatus includes: a first receiving module 910 and a setting module 920.

The first receiving module 910 is configured to receive transport blocks scheduled by the base station on a physical downlink control channel (PDCCH).

The setting module 920 is configured to set a transmission interval among the transport blocks according to the scheduled transport blocks and the transmission interval parameters, in which the transmission interval parameters are configured to determine a setting mode of the transmission interval among the transport blocks, the transport blocks include at least one of physical uplink shared channel (PUSCH) transport blocks and physical downlink shared channel (PDSCH) transport blocks.

In a possible implementation, the transmission interval parameters include a transmission interval period and a transmission interval duration.

The transmission interval period and the transmission interval duration are both configurable values; or, the transmission interval period is a configurable value, and the transmission interval duration is a fixed value; or, the transmission interval period is a fixed value, and the transmission interval duration is a configurable value.

In a possible implementation, the transmission interval period is a configurable value. In responding to adopting the continuous transmission mode, the transmission interval period is determined according to a number of times of repeated transmissions of the transport blocks, after a current transport block is repeatedly transmitted for n times in the continuous transmission mode, and a next transport block is repeatedly transmitted, and n represents a total number of times of repeated transmissions of the transport blocks; or, in responding to adopting an alternate transmission mode, the transmission interval period is determined by an alternate transport unit, wherein the alternate transport unit is a smallest transport unit comprising different transport blocks; or, the transmission interval period is determined according to the number of scheduled transport blocks; or, the transmission interval period is determined by an absolute time unit, wherein the absolute time unit includes at least one of a subframe and a time slot.

In a possible implementation, the transmission interval duration is a configurable value.

The transmission interval duration is determined according to the number of times of repeated transmissions of the transport blocks; or, the transmission interval duration is determined according to the number of scheduled transport blocks; or, the transmission interval duration is determined by an absolute time unit, wherein the absolute time unit includes at least one of a subframe and a time slot.

In a possible implementation, the apparatus further includes: a second receiving module, configured to receive the transmission interval parameters configured by adopting a high-level signaling by a base station, the high-level signaling includes at least one of a radio resource control (RRC) signaling and a media access control element (MAC CE) signaling.

In a possible implementation, the first receiving module 910 is configured to: receive downlink control information (DCI) sent by the base station through the PDCCH, the DCI includes parameter usage information configured to indicate whether the transmission interval is preset in a current scheduling.

The setting module 920 is configured to: in responding to the parameter usage information indicating to configure the transmission interval, set the transmission interval among the transport blocks according to the scheduled transport blocks and the transmission interval parameters.

In a possible implementation, the setting module 920 is configured to: in responding to adopting multi-transport-block scheduling, set the transmission interval among the transport blocks according to the scheduled transport blocks and the transmission interval parameters, the multi-transport-block scheduling refers to scheduling at least two transport blocks on the PDCCH; or, in responding to the number of times of repeated transmissions of the transport blocks being greater than a threshold of times of repeated transmissions, set the transmission interval among the transport blocks according to the scheduled transport blocks and the transmission interval parameters; or, in responding to the number of the transport blocks being greater than a number threshold, set the transmission interval among the transport blocks according to the scheduled transport blocks and the transmission interval parameters; or, in responding to a total transmission duration being greater than a duration threshold, set the transmission interval among the transport blocks according to the scheduled transport blocks and the transmission interval parameters, the total transmission duration is determined according to the number of the transport blocks and the number of times of repeated transmissions of the transport blocks.

It should be noted that the modules related to signaling and data transmission in the above devices can be implemented as hardware devices such as radio frequency antennas, and the modules related to signaling and data processing can be implemented as hardware devices such as central processing units or baseband processors.

Figure 10:
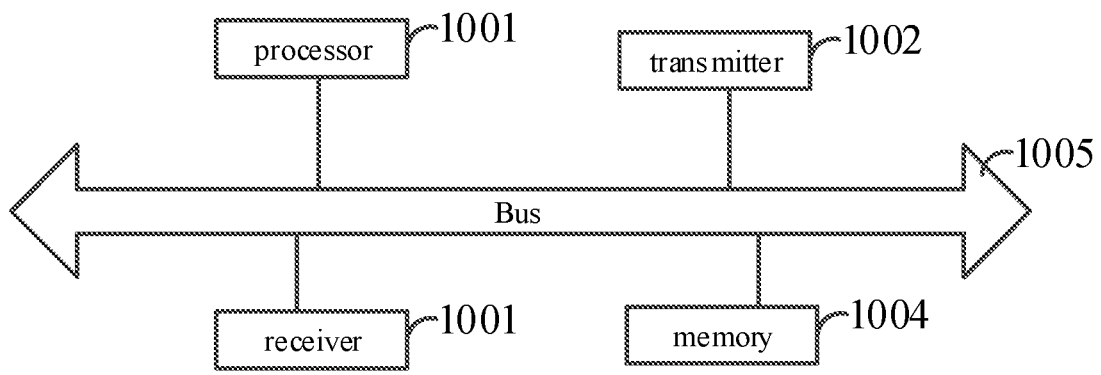
FIG. 10 is a schematic diagram of a terminal according to an exemplary embodiment of the disclosure.

FIG. 10 is a schematic diagram of a terminal according to an exemplary embodiment of the disclosure. The terminal includes: a processor 1001, a receiver 1002, a transmitter 1003, a memory 1004, and a bus 1005.

The processor 1001 includes one or more processing cores, and the processor 1001 executes various functional applications and information processing by running software programs and modules.

The receiver 1002 and the transmitter 1003 may be implemented as one communication component, which may be a piece of a communication chip.

The memory 1004 is connected to the processor 1001 through a bus 1005.

The memory 1004 may be used to store at least one instruction, and the processor 1001 is configured to execute the at least one instruction to implement each step in the above method embodiments.

The memory 1004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

In an exemplary embodiment, a computer-readable storage medium is also provided. The computer-readable storage medium stores at least one instruction, at least one segment of program, code set, or instruction set, and the at least one instruction, or the at least at least one segment of program, code set or instruction set is loaded and executed by the processor to implement the method for scheduling transport blocks with the terminal as the execution subject in the above method embodiments.

Figure 11:
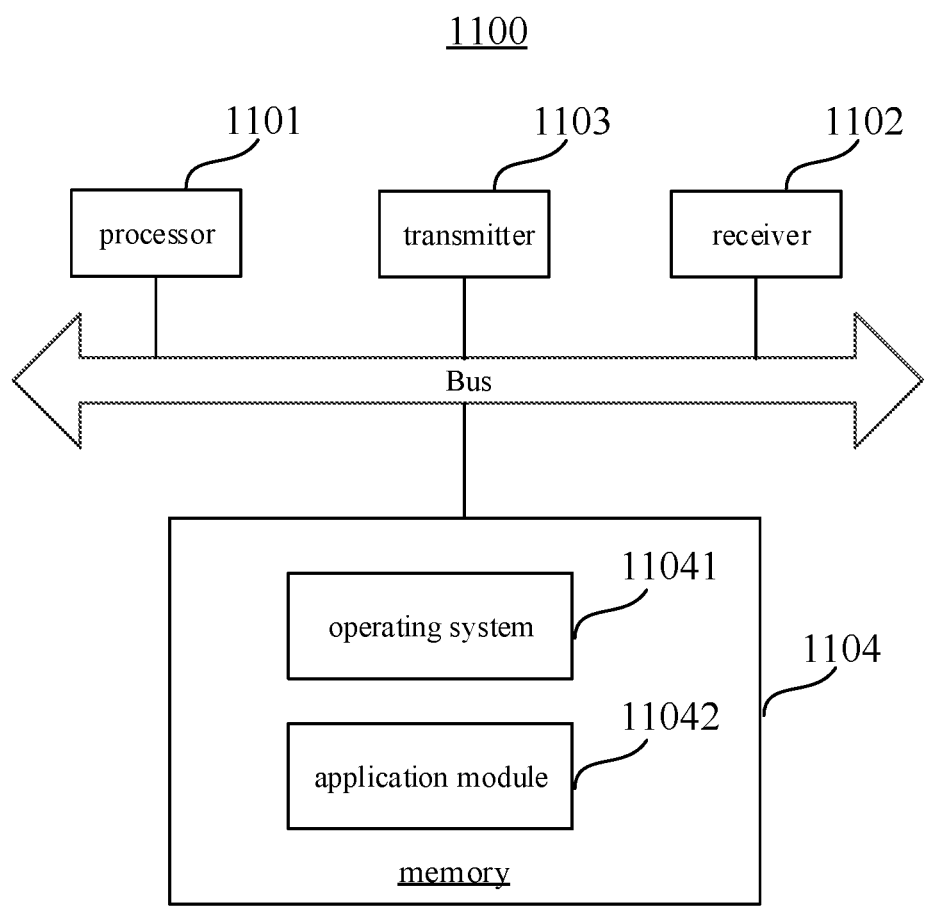
FIG. 11 is a schematic diagram of an access network device (a base station) according to an exemplary embodiment of the disclosure.

FIG. 11 is a schematic diagram of an access network device (a base station) according to an exemplary embodiment.

The access network device 1100 may include: a processor 1101, a receiver 1102, a transmitter 1103, and a memory 1104. The receiver 1102, the transmitter 1103, and the memory 1104 are respectively connected to the processor 1101 through a bus.

The processor 1101 includes one or more processing cores. The processor 1101 runs software programs and modules to execute the method executed by the access network device in the method for scheduling transport blocks according to the embodiments of the disclosure. The memory 1104 is configured to store software programs and modules. In detail, the memory 1104 may store an operating system 11041 and an application program module 11042 required by at least one function. The receiver 1102 is configured to receive communication data sent by other devices, and the transmitter 1103 is configured to send the communication data to other devices.

In an exemplary embodiment, a computer-readable storage medium is provided. The computer-readable storage medium stores at least one instruction, at least one segment of program, code set or instruction set, and the at least one instruction, or the at least one segment of program, the code set or the instruction set is loaded and executed by the processor to implement the method for scheduling the transport blocks with the base station as the execution subject in the above method embodiments.

It would be understood by those skilled in the art that all or a part of the steps carried by the method in the above-described embodiments may be completed by relevant hardware instructed by a program. The program may be stored in a computer readable storage medium. The storage medium may be a magnetic disk, an optical disk or a read-only memory (ROM).

The above descriptions are only preferred embodiments of the disclosure and are not intended to limit the disclosure. Any modification, equivalent replacement and improvement made within the spirit and principle of the disclosure shall be included in the protection scope of the disclosure.

What is claimed is:

1. A method for scheduling transport blocks, comprising:
   determining transmission interval parameters, wherein the transmission interval parameters are used to determine a mode of setting a transmission interval among transport blocks;
   scheduling the transport blocks on a physical downlink control channel (PDCCH) according to the transmission interval parameters, the transport blocks scheduled on the PDCCH comprising physical downlink shared channel (PDSCH) transport blocks;
   wherein determining the transmission interval parameters comprises:
   determining the transmission interval parameters when a preset condition is met; wherein the preset condition comprises:
   adopting multi-transport-block scheduling, wherein the multi-transport-block scheduling refers to scheduling at least two different transport blocks on the PDCCH.

2. An apparatus for scheduling transport blocks, comprising:
   one or more processors;
   a memory storing instructions executable by the one or more processors;
   wherein the one or more processors are configured to implement the method of claim 1.

3. The method according to claim 1, wherein the transmission interval parameters comprise a transmission interval period and a transmission interval duration;
   the transmission interval period and the transmission interval duration are both configurable values; or,
   the transmission interval period is a configurable value, and the transmission interval duration is a fixed value; or,
   the transmission interval period is a fixed value, and the transmission interval duration is a configurable value.

4. The method according to claim 3, wherein the transmission interval period is a configurable value, and determining the transmission interval parameters comprises:
   in responding to adopting the continuous transmission mode, determining the transmission interval period according to a number of times of repeated transmissions of the transport blocks; or,
   in responding to adopting an alternate transmission mode, determining the transmission interval period by an alternate transport unit, the alternate transport unit being a smallest transport unit comprising different transport blocks; or,
   determining the transmission interval period according to the number of scheduled transport blocks; or,
   determining the transmission interval period by an absolute time unit, the absolute time unit comprising at least one of a subframe and a time slot.

5. The method according to claim 3, wherein the transmission interval duration is a configurable value, and determining the transmission interval parameter comprises:
   determining the transmission interval duration according to the number of times of repeated transmissions of the transport blocks; or, determining the transmission interval duration according to the number of scheduled transport blocks; or, determining the transmission interval duration by an absolute time unit, the absolute time unit comprising at least one of a subframe and a time slot.

6. The method according to claim 1, further comprising:
configuring the transmission interval parameters for a terminal adopting a high layer signaling, wherein the high layer signaling comprises at least one of a radio resource control (RRC) signaling and a media access control element (MAC CE) signaling.

7. The method according to claim 1, wherein scheduling the transport blocks on the PDCCH according to the transmission interval parameters comprises:

in responding to adopting multi-transport-block scheduling, scheduling the transport blocks on the PDCCH according to the transmission interval parameters, wherein the multi-transport-block scheduling refer to scheduling at least two transport blocks on the PDCCH; or, sending downlink control information (DCI) to the terminal through the PDCCH, the DCI comprising parameter usage information configured to indicate whether the transmission interval is preset in a current scheduling; or, scheduling the transport blocks on the PDCCH according to the transmission interval parameters in responding to the number of the transport blocks being greater than a number threshold; or, scheduling the transport blocks on the PDCCH according to the transmission interval parameters in responding to the number of repeated transmissions of the transport blocks being greater than the threshold; or, scheduling the transport blocks on the PDCCH according to the transmission interval parameters in responding to a total transmission duration being greater than a duration threshold, wherein the total transmission duration is determined according to the number of the transport blocks and the number of times of repeated transmissions of the transport blocks.

8. A method for scheduling transport blocks, comprising:
receiving transport blocks scheduled by the base station on a physical downlink control channel (PDCCH);
setting a transmission interval among the transport blocks according to the scheduled transport blocks and the transmission interval parameters, wherein the transmission interval parameters are configured to determine a setting mode of the transmission interval among the transport blocks, the transport blocks comprise physical downlink shared channel (PDSCH) transport blocks;
wherein the transmission interval parameters are determined when a preset condition is met, and the preset condition comprises:
adopting multi-transport-block scheduling, wherein the multi-transport-block scheduling refers to scheduling at least two different transport blocks on the PDCCH.

9. The method according to claim 8, wherein the transmission interval parameters comprise a transmission interval period and a transmission interval duration;
the transmission interval period and the transmission interval duration are both configurable values; or,
the transmission interval period is a configurable value, and the transmission interval duration is a fixed value; or,
the transmission interval period is a fixed value, and the transmission interval duration is a configurable value.

10. The method according to claim 9, wherein the transmission interval period is a configurable value;
in responding to adopting the continuous transmission mode, the transmission interval period is determined according to a number of times of repeated transmissions of the transport blocks, after a current transport block is repeatedly transmitted for n times in the continuous transmission mode, and a next transport block is repeatedly transmitted, and n represents a total number of times of repeated transmissions of the transport blocks; or, in responding to adopting an alternate transmission mode, the transmission interval period is determined by an alternate transport unit, wherein the alternate transport unit is a smallest transport unit comprising different transport blocks; or, the transmission interval period is determined according to the number of scheduled transport blocks; or, the transmission interval period is determined by an absolute time unit, wherein the absolute time unit comprises at least one of a subframe and a time slot.

11. The method according to claim 9, wherein the transmission interval duration is a configurable value;
the transmission interval duration is determined according to the number of times of repeated transmissions of the transport blocks; or,
the transmission interval duration is determined according to the number of scheduled transport blocks; or,
the transmission interval duration is determined by an absolute time unit, wherein the absolute time unit comprises at least one of a subframe and a time slot.

12. The method according to claim 8, further comprising:
receiving the transmission interval parameters configured by adopting a high layer signaling by a base station, wherein the high layer signaling comprises at least one of a radio resource control (RRC) signaling and a media access control element (MAC CE) signaling.

13. The method according to claim 8, wherein receiving the transport blocks scheduled on the PDCCH by the base station comprises:
receiving downlink control information (DCI) sent by the base station through the PDCCH, wherein the DCI comprises parameter usage information configured to indicate whether the transmission interval is preset in a current scheduling; and
setting the transmission interval among the transport blocks according to the scheduled transport blocks and the transmission interval parameters comprises:
in responding to the parameter usage information indicating to configure the transmission interval, setting the transmission interval among the transport blocks according to the scheduled transport blocks and the transmission interval parameters.

14. The method according to claim 8, wherein setting the transmission interval among the transport blocks according to the scheduled transport blocks and the transmission interval parameters comprises:
in responding to adopting multi-transport-block scheduling, setting the transmission interval among the transport blocks according to the scheduled transport blocks and the transmission interval parameters, wherein the multi-transport-block scheduling refers to scheduling at least two transport blocks on the PDCCH; or,
in responding to the number of times of repeated transmissions of the transport blocks being greater than a threshold of times of repeated transmissions, setting the transmission interval among the transport blocks according to the scheduled transport blocks and the transmission interval parameters; or, in responding to the number of the transport blocks being greater than a number threshold, setting the transmission interval among the transport blocks according to the scheduled transport blocks and the transmission interval parameters; or, in responding to a total transmission duration being greater than a duration threshold, setting the transmission interval among the transport blocks according to the scheduled transport blocks and the transmission interval parameters, wherein the total transmission duration is determined according to the number of the transport blocks and the number of times of repeated transmissions of the transport blocks.

15. A terminal, comprising:
a processor;
a transceiver connected to the processor; and
a memory for storing processor executable instructions;
wherein the processor is configured to load and execute the executable instructions to implement the method for scheduling transport blocks according to claim 8.

16. An apparatus for scheduling transport blocks, comprising:
one or more processors;
a memory storing instructions executable by the one or more processors;
wherein the one or more processors are configured to:
receive transport blocks scheduled by the base station on a physical downlink control channel (PDCCH);
set a transmission interval among the transport blocks according to the scheduled transport blocks and the transmission interval parameters, wherein the transmission interval parameters are configured to determine a setting mode of the transmission interval among the transport blocks, the transport blocks comprise physical downlink shared channel (PDSCH) transport blocks;
wherein the transmission interval parameters are determined when a preset condition is met, and the preset condition comprises:
adopting multi-transport-block scheduling, wherein the multi-transport-block scheduling refers to scheduling at least two different transport blocks on the PDCCH.

17. The apparatus according to claim 16, wherein the one or more processors are configured to: receive the transmission interval parameters configured by adopting a high layer signaling by a base station, wherein the high layer signaling comprises at least one of a radio resource control (RRC) signaling and a media access control element (MAC CE) signaling.

18. The apparatus according to claim 16, wherein the one or more processors are configured to:
receive downlink control information (DCI) sent by the base station through the PDCCH, wherein the DCI comprises parameter usage information configured to indicate whether the transmission interval is preset in a current scheduling; and
in responding to the parameter usage information indicating to configure the transmission interval, set the transmission interval among the transport blocks according to the scheduled transport blocks and the transmission interval parameters.

19. The apparatus according to claim 16, wherein the one or more processors are configured to:
in responding to adopting multi-transport-block scheduling, set the transmission interval among the transport blocks according to the scheduled transport blocks and the transmission interval parameters, wherein the multi-transport-block scheduling refers to scheduling at least two transport blocks on the PDCCH; or,
in responding to the number of times of repeated transmissions of the transport blocks being greater than a threshold of times of repeated transmissions, set the transmission interval among the transport blocks according to the scheduled transport blocks and the transmission interval parameters; or,
in responding to the number of the transport blocks being greater than a number threshold, set the transmission interval among the transport blocks according to the scheduled transport blocks and the transmission interval parameters; or,
in responding to a total transmission duration being greater than a duration threshold, set the transmission interval among the transport blocks according to the scheduled transport blocks and the transmission interval parameters, wherein the total transmission duration is determined according to the number of the transport blocks and the number of times of repeated transmissions of the transport blocks.

\* \* \* \* \*